United States Patent [19] [11] 3,973,491

Porth et al. [45] Aug. 10, 1976

[54] FLOOD COATER AND SQUEEGEE WITH VISCOSITY SENSING AND CONTROL

[75] Inventors: Frank L. Porth, Morley; James A. Black, Kent City; Harry Russell Farwell, Cedar Springs, all of Mich.

[73] Assignee: James A. Black, Kent City, Mich.

[22] Filed: Oct. 29, 1974

[21] Appl. No.: 518,768

[52] U.S. Cl. .................... 101/124; 101/123; 137/92

[51] Int. Cl.[2] .................... B41F 15/46; G05D 11/12

[58] Field of Search .......... 101/114, 115, 123, 124; 137/92; 73/54

[56] References Cited

UNITED STATES PATENTS

| | | | |
|---|---|---|---|
| 1,577,555 | 3/1926 | Beadle | 137/92 |
| 2,192,039 | 2/1940 | Harcourt | 137/92 X |
| 3,252,411 | 5/1966 | Black | 101/124 |
| 3,731,623 | 5/1973 | Bubley et al. | 101/123 X |

*Primary Examiner*—Edgar S. Burr
*Assistant Examiner*—R. E. Suter
*Attorney, Agent, or Firm*—Price, Heneveld, Huizenga & Cooper

[57] ABSTRACT

A stencilling printer with a flow coater specially mounted to sense viscosity of stencil fluid flowing from a reservoir between the flow coater and the squeegee, the flow coater being shiftable and operably associated with a supply of viscosity-altering liquid for controllably altering the viscosity of stencil fluid in the reservoir.

11 Claims, 7 Drawing Figures

FLOOD COATER AND SQUEEGEE WITH VISCOSITY SENSING AND CONTROL

BACKGROUND OF THE INVENTION

This invention relates to stencilling apparatus, and more particularly, to screen stencil printing with a recycled stencil fluid, the viscosity of which is regulated in response to sensing thereof by the flow coater.

Screen stencilling is widely used for selectively depositing coating materials such as inks, adhesives, and other functional and/or decorative deposits through a screen stencil onto stock such as paper, polymers, cloth, wood, laminates, and the like for making posters, decalcomania coatings, graphic designs, and the like. A typical apparatus for screen stencilling is set forth in U.S. Pat. No. 2,606,492. Usually, the process involves the spreading of a layer of the fluid on a fine mesh screen, followed by forcing a part of the fluid layer through the pattern areas of the screen with a squeegee onto the stock. The excess ink is forced to one end of the screen by this squeegee. The excess ink is spread back into the screen by a flow coater for the next stencilling stroke. A common tendency of the stencilling fluid is to thicken because of solvent or carrier liquid evaporation while the stencilling fluid is repeatedly spread on the stencil screen.

One type of apparatus for controlling the viscosity of the stencilling fluid is set forth in U.S. Pat. No. 3,252,411. In such apparatus, the fluid is pumped out of the printing apparatus to special external viscosity testing and altering equipment associated with the printing carriage. The fluid is then pumped back to the ink reservoir for application to the stencil screen. This last-noted apparatus does provide viscosity control not achievable with the prior equipment. However, the apparatus is relatively complex, especially with regard to the separated viscosity testing and altering equipment.

SUMMARY OF THE INVENTION

An object of this invention is to provide stencilling apparatus wherein the viscosity of the stencilling fluid is constantly sensed directly at the stencil screen while the fluid is being coated on the screen by the flow coater.

Another object of this invention is to provide stencilling apparatus having a special flow coater that senses the viscosity of fluid being coated and activates viscosity control apparatus to regulate fluid viscosity. The flow coater responds to the resistance of the fluid flowing beneath it to effect this sensing function. The viscosity control is achieved by addition of a controlled quantity of viscosity altering liquid, usually a solvent or carrier, to the stencilling fluid. The stencilling fluid is partially forced by a squeegee through the stencil screen in conventional fashion, while the excess is recycled preferably by flow directly through special openings in the squeegee, into a reservoir formed between the squeegee and the flow coater.

Another object of this invention is to provide a pivotally shiftable flow coater blade responsive to increases in the viscosity of stencilling fluid flowing thereunder to activate an injector of viscosity lowering liquid into the fluid yet to be coated. In the preferred embodiment set forth, the coating function occurs simultaneously with the printing function.

These and other objects, advantages, and features of the invention will be apparent from a study of the detailed specification in conjunction with the drawings.

DESCRIPTION OF THE PREFERRED EMBODIMENT

Figure 3:
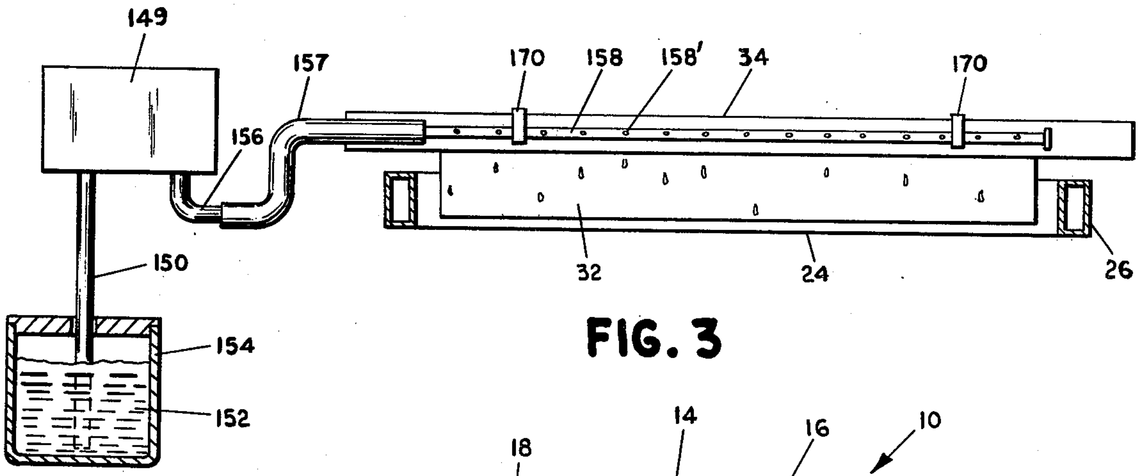
FIG. 3 is an elevational, partially schematic view of the squeegee assembly of this invention.
Figure 1:
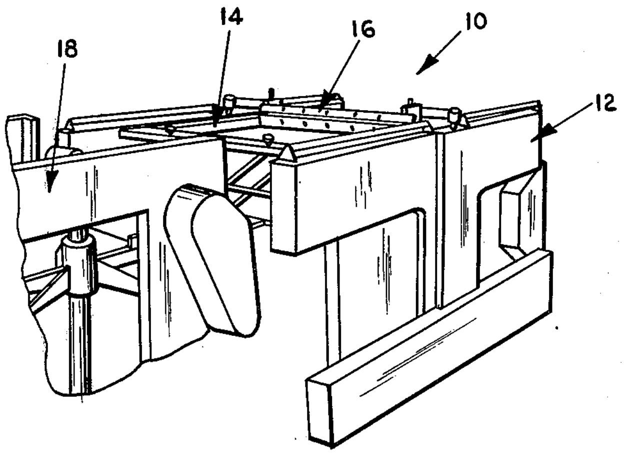
FIG. 1 is a perspective view of a stencil screen printing press employing this invention.

Referring now specifically to the drawings, the complete press assembly 10 there depicted includes a frame subassembly 12, a stencil frame subassembly 14, a squeegee subassembly 16, and a stock infeed subassembly 18. Beneath the squeegee subassembly 16 is a stock supporting subassembly 20 (FIG. 7), most frequently a rotational cylinder or drum. The framework subassembly 12 and stock supporting subassembly 20 may be of conventional construction as in U.S. Pat. Nos. 2,606,492 or 3,120,180, for example. Alternatively, the stock support can be flat as in U.S. Pat. No. 2,917,997, for example. The stock infeed subassembly 18 and outfeed subassembly can also be conventional.

The particular stock involved may be either sheet stock or web stock. If web stock, web handling equipment of the type set forth in U.S. Pat. Nos. 3,779,160 or 3,650,207 can be employed. The stencil frame subassembly 14 can also be of conventional type as, for example, in U.S. Pat. Nos. 3,359,663 or 3,273,497.

The squeegee subassembly 16 is located above the stock support or impression cylinder subassembly 20, while the stencil frame 26 is therebetween in usual fashion. Relative motion between the squeegee 32 and stencil 24 is preferably achieved by not moving the squeegee 32 horizontally, while horizontally reciprocating the stencil 24 in its frame and advancing the stock support.

Figure 6:
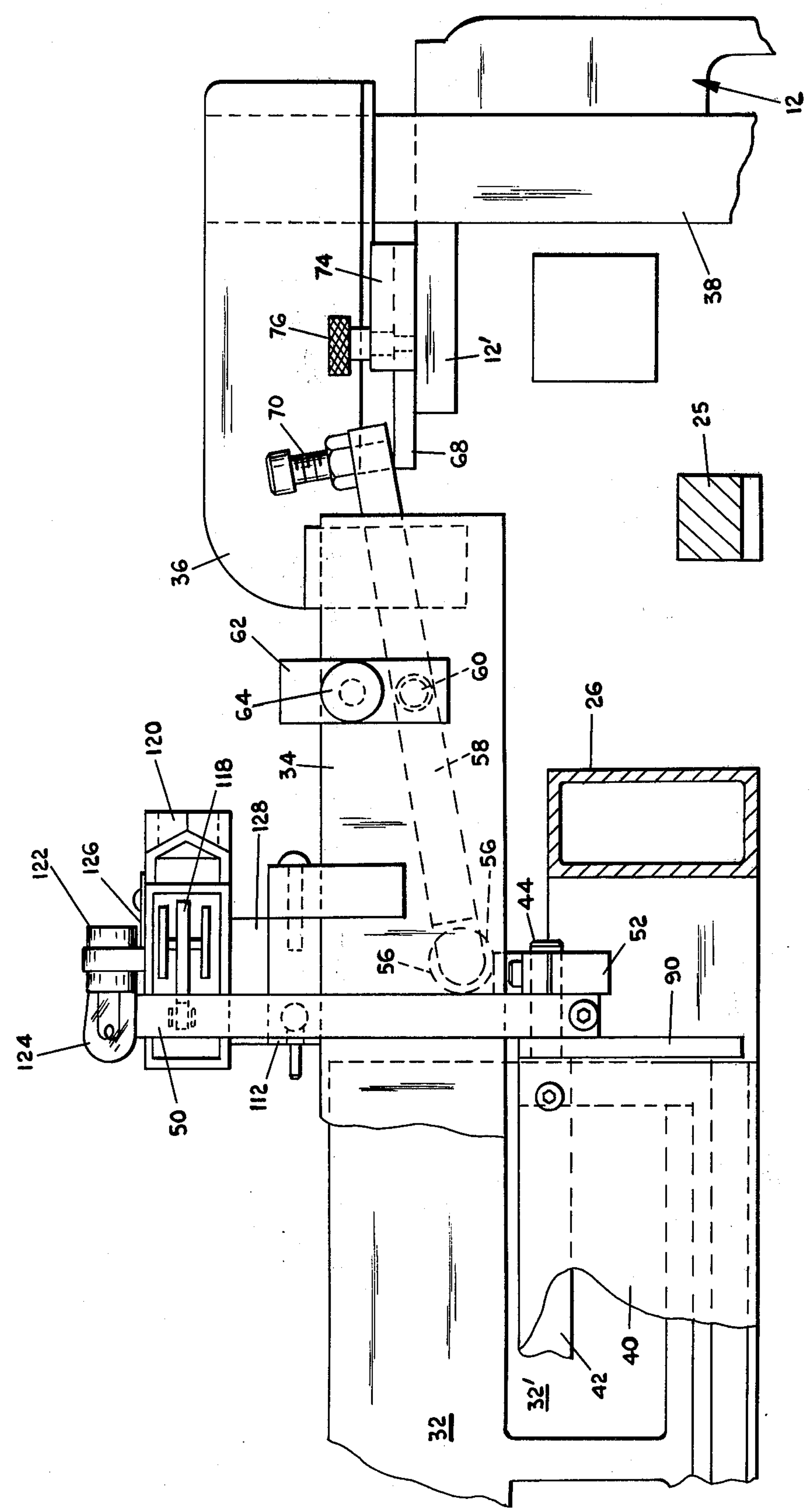
FIG. 6 is an elevational view of the apparatus in FIG. 5.

The stencil screen 24 extends across the bottom plane of stencil frame 26 immediately above the surface of support 20 upon which stock 28 is maintained, so that blade 30 of squeegee 32 can force liquid through the open pattern areas of the stencil screen onto the stock 28 as the relative motion between the squeegee and stencil occurs. The stencil frame can be reciprocated by suitable gears engaging racks 25 (FIG. 6), or the like. Stock 28 advances with the screen.

The transversely extending squeegee 32 is supported along the crown of the drum 20 on a suitable mounting plate 34, the opposite ends of which are secured to a pair of brackets 36. These bracets in turn are mounted upon vertically reciprocable columns 38 slidably supported in framework 12 of the press. Suitable shifting mechanism such as cams, solenoids, air cylinders, or the like (not shown) are connected in conventional fashion to reciprocate columns 38 and thus raise and lower the squeegee subassembly 16 relative to the stencil frame 26. Normally, the stencil frame is also caused to move vertically relative to support cylinder 20 by shifting the stencil frame vertically up away from the support cylinder during the non-print return stroke of the stencil frame, so as not to smear the freshly coated liquid on the stock. Alternatively, the cylinder or drum can be lowered away from the stencil screen 24 for this purpose. Since this forms no part of the present invention and is very conventional, further description is not necessary.

Spaced behind squeegee 32, relative to the squeegee in the print stroke, is a flow coater blade 40, the lower edge of which is vertically spaced above the horizontal plane of the lower edge of blade 30 of squeegee 32. This spacing is preset to controlled fraction of an inch for obtaining a predetermined coating thickness of the spreading fluid flowing beneath the flow coater blade during the printing stroke. This flow coater 40 also extends transversely of the stencil screen frame, being parallel to the squeegee. It has its upper edge mounted to a support member 42 having pivot pins 44 on its opposite ends. These pivot pins 44 rotate with pivoting of the flow coater, and are pivotally mounted in a pair of end plates 100 to support the flow coater.

Also secured on one of these pivot pins 44, i.e., on one end of the squeegee subassembly, is a first upright lever 50 and a second longitudinally extending lever 52. Lever 50 is pivotally responsive to pivotal movement of flow coater 40 to actuate switching mechanism 120 in a manner to be described. Lever 52 is operated by a cam roller 56 to forcefully pivot flow coater 40 toward and away from the squeegee 32 in a manner to be described, for closing and opening the bottom of reservoir 90.

Roller 56 engages the free end of cantilevered lever 52. This roller is on the end of a fulcrumed lever 58. Lever 58 is pivotally secured intermedite its ends on a pin 60. Pin 60 is attached to bracket 62 which in turn is secured to mount 34 by a threaded fastener 64. The opposite end of lever 58 from wheel 56 is adapted to abut a stop plate 68. An abutment stud 70 on lever 58 is vertically adjustable to control the engagement with stop plate 68 in a fashion and for a reason to be understood from the description to follow. Stop plate 68 is laterally slidable on a fixed plate portion 12' of frame subassembly 12 within guide 74, to be shiftable to an inactive position out of engagement with lever 58. The position of stop plate 68 relative to guide 74 can be varied by loosening set screw 76 to allow its shank to shift in slot 74'. Raising and lowering of mount 34 by columns 38 causes lever 58 to pivot with engagement and disengagement of stop plate 68 to shift wheel 56 vertically, thereby shifting lever 52 vertically which moves flow coater 40 toward and away from squeegee 32. The space between squeegee 32 and flow coater 40 defines a fluid reservoir 90 (FIG. 7) generally closed on the ends by end plates 100. When flow coater 40 is shifted into engagement with the back surface of squeegee 32, this reservoir is closed at the bottom, while shifting of flow coater 40 away from the squeegee opens the bottom of this reservoir to allow liquid to be in contact with stencil screen 24 and to also flow under the lower edge of the flow coater when the stencil is advanced. End plates 100 have their forward edges secured to squeegee 32, and extend back astraddle the ends of flow coater 40.

Figure 4:
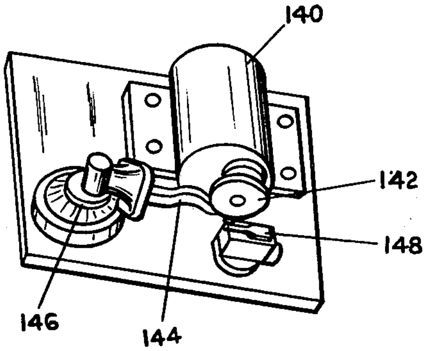
FIG. 4 is a perspective view of the fluid pumping portion of the apparatus.
Figure 2:
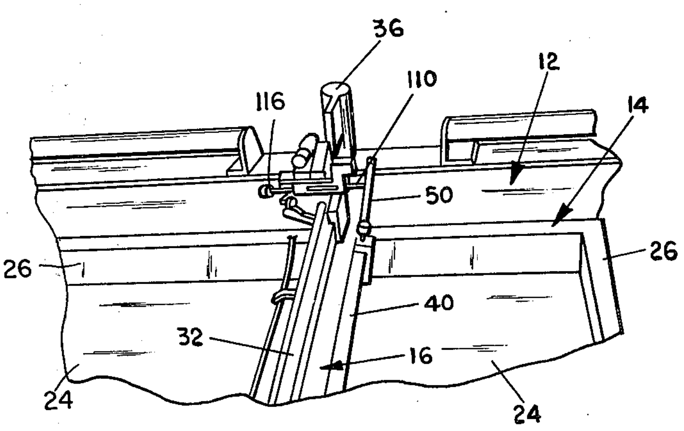
FIG. 2 is a fragmentary, somewhat enlarged perspective view of a portion of the press in FIG. 1.
Figure 5:
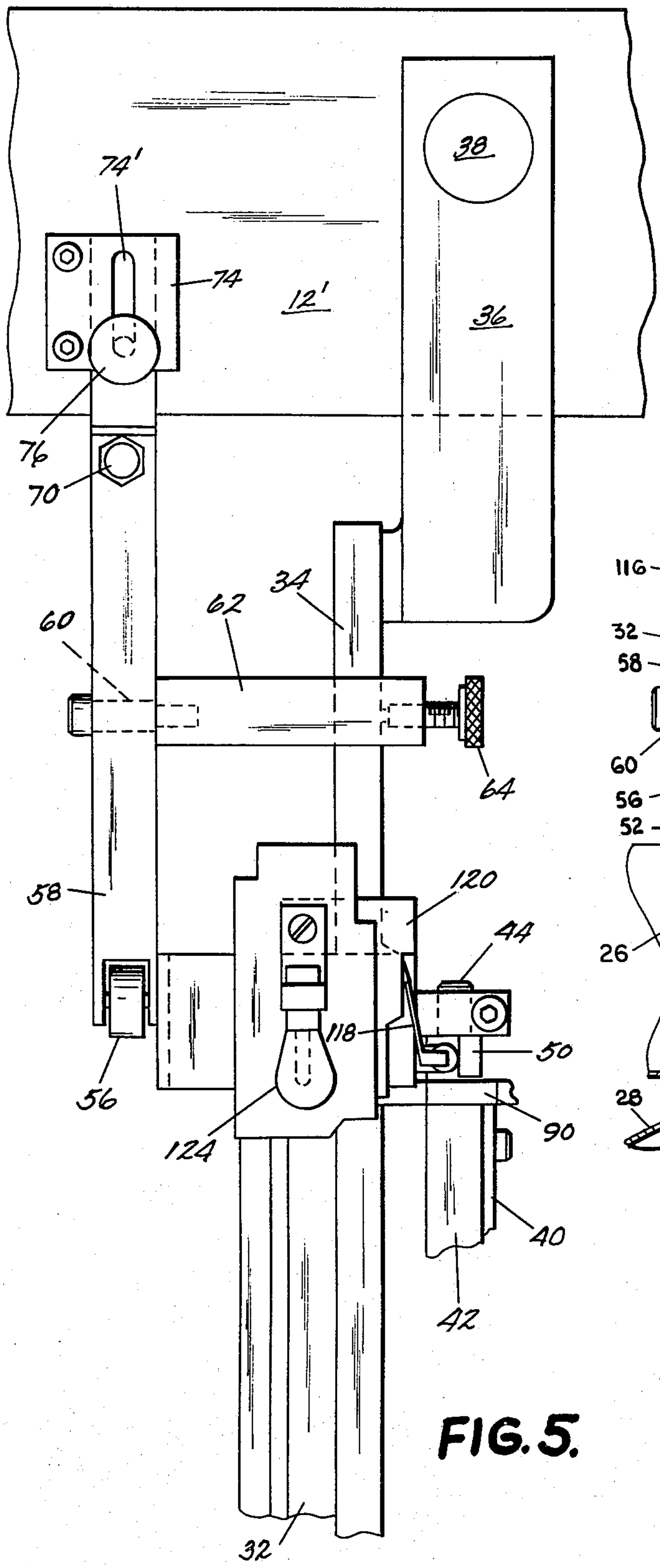
FIG. 5 is a substantially enlarged plan view of a portion of the apparatus in FIG. 2.

The shifting of flow coater 40 by lever 52 is for the purpose of opening and closing this reservoir during the print and return strokes, respectively, as will be understood more fully from the description to follow. Thus, printing ink or other functional fluid is dispensed from this reservoir 90 and uniformly coated on the stencil by flow coater 40, as the squeegee prints ahead of this flow coater and reservoir. The excess ink ahead of the squeegee flows up and back through passages 32', i.e., through the body of the squeegee, into reservoir 90 behind the squeegee. During this coating, printing and recycling, solvent or other carrier fluid in the ink or other fluid tends to steadily evaporate, causing the fluid to increase in viscosity. Significant increase in viscosity changes the quality of printing and is undesirable. With this novel assembly, as the viscosity increases slightly, the flowing force of the ink or other fluid through the restricted area of the slot beneath the lower edge of flow coater 40 and above the upper surface of the screen increases causing the novel flow coater to proportionately pivot counterclockwise (as viewed in FIG. 7) about pivot pins 44. This then applies a rotational shifting force to lever 50, overcoming the controlled bias on slide plunger 110 (FIG. 7) which engages lever 50 intermediate its ends and is slidably mounted in a housing 112. The bias is supplied by a compression coil spring 114 trapped in this housing between the inner end of pin 110 and an adjustable stud 116. Also engaging the upper end of lever 50 is the spring-mounted actuator 118 of a conventional limit switch 120. Mounted atop this limit switch by a bracket 126 is a bulb socket 122 retaining a lightbulb 124 therein. Switch 120 is mounted on support 128 above housing 112 which in turn is secured to member 34. A predetermined arcuate movement, therefore, of lever 50 in a counterclockwise direction will ultimately cause the limit switch to be activated when the viscosity increases to a certain predetermined valve. This electrically actuates the bulb 124 but more importantly, simultaneously activates electrical motor 140 (FIG. 4) which operates a pump 46.

This motor has a cam 142 mounted on its drive shaft, which cam engages with a cam follower 144 forming part of a liquid pump 146. This can be a simple diaphragm pump such as a fuel pump from an internal combustion engine or the like. Rotation of the cam 142 reciprocates cam follower 144 to cause a pumping action, which preferably is limited to one rotation of cam 142 by another limit switch 148 activated by the cam as it completes one revolution. Pump 146 has a supply conduit 150 (FIG. 3) communicating with a supply 152 of liquid in a suitable container 154 forming a reservoir. An output 156 from the pump includes a perforated dispensing tube 158 extending over the stencil frame adjacent squeegee 32. The motor 140, pump 146, and control switch 148 are preferably enclosed in a housing 149 (FIG. 3).

Liquid dispensing tube 158 can be mounted immediately ahead of squeegee 32, relative to the direction of printing motion of the squeegee. This is shown in FIG. 3 and in phantom lines in FIG. 7. This tube can be held in position by any suitable brackets 170 attached to squeegee 32. An alternative positioning of tube 158 is shown at **158*a* in FIG. 7, i.e., behind squeegee 32, between squeegee 32 and flow coater 40, above the fluid level in reservoir 90. Again, suitable brackets 170*a* may be attached to squeegee 32 to support the tube in this position. Each of these two positions is advantageous for certain types of arrangements as explained more fully hereinafter. Outlet 156 from the pump is connected to this conduit dispensing tube 158 as by a flexible conduit 157** or the like to allow the squeegee subassembly to be freely vertically reciprocated.

OPERATION

The operation of the press basically includes a print stroke and a return stroke. During the print stroke, the stencil screen frame 26 with screen 24 moves in one direction between the lowered squeegee subassembly 16 and the underlying stock 28 on the stock support subassembly 20. During the return stroke, the stencil screen 24 is returned while the squeegee subassembly 16 is elevated and the stencil screen is out of engagement with the departing stock just printed. During this return stroke, the new stock is introduced to be subsequently printed.

The operation is started by inserting a stencil screen 24 with the desired stencil thereon between the squeegee subassembly 16 and support cylinder 20 and preparing the web or sheet stock 28 to be fed into registry on the support surface or cylinder 20. Ink or other functional liquid is placed in reservoir 90 between squeegee 32 and closed flow coater 40 while the squeegee subassembly is elevated by columns 38. In this condition, the flow coater is in engagement with the back edge of the squeegee to close off the bottom of reservoir 90. Excess solvent or carrier liquid for the ink or other functional liquid is contained in reservoir 154 and motor 140 is inactive at this time.

During the print stroke, columns 38 are lowered, thereby lowering the entire squeegee subassembly into printing relationship relative to the stencil screen. On the first stroke, the unit will not print unless ink has been previously applied to the stencil screen, because the ink is flow coated on the screen immediately behind the squeegee during the print stroke. Assuming, therefore, that the second print stroke is about to begin, and the squeegee subassembly is lowered, this causes the outer end of lever 58 to engage stop plate 68, causing it to pivot about its central pin 60 to lower wheel 56 and thereby depress lever 52. This depression rotation of lever 52 about its pivot 44 causes flow coater 40 to tilt away from the squeegee and open the bottom of reservoir 90.

The shifting of flow coater 40 away from squeegee 32 is against the bias of coil spring 114 compressed by pin 110 as lever 50 pivots with the flow coater. This initial pivoting of lever 50 also depresses part way the limit switch 118 but insufficient to throw the switch. Instead of this mechanical lever system of opening and closing the reservoir by shifting the flow coater out of and into engagement with the squeegee, alternative operating means could be employed such as an electrical solenoid, a fluid cylinder, and the like. As the stencil screen moves beneath the squeegee and flow coater, squeegee blade 30 in engagement with the screen forces some of the ink ahead of it through stencil 24 onto stock 28 on support surface 20. The excess ink ahead of the squeegee blade flows up and back through openings 32' in squeegee 32 into reservoir 90. As the squeegee prints, the trailing flow coater, by its slight spacing above stencil 24, allows a controlled thickness of liquid to flow from reservoir 90, beneath the lower edge of flow coater 40, and onto stencil 24 for the next print stroke.

During the return stroke, after the print stroke has been completed, the squeegee subassembly is elevated by columns 38, enabling the stencil screen to be returned to its initial position without the squeegee forcing ink through it on the return stroke. Lifting of the squeegee subassembly enables lever 58 to shift away from the stop plate 68, allowing wheel 56 to rise, allowing lever 52 to rise, and enabling compression spring 114 to shift lever 50, which thereby rotates the flow coater 40 into engagement with squeegee 32 to close the bottom of the liquid reservoir 90. The stencil frame is also shifted vertically above the print cylinder and stock during this return stroke.

After repeated print strokes and return strokes, with the ink being repeatedly flow coated onto the stencil and excess ink being recycled back into reservoir 90 through openings 32' in squeegee 32, evaporation of the solvent or carrier liquid occurs to increase the viscosity of the ink or other functional liquid being coated. The flow coater 40 is sensitive to the increased viscosity of the liquid flowing through the restricted slot defined by its lower edge and the stencil. The increased drag on the flow coater with increased viscosity of the fluid causes the lower edge of the flow coater to pivotally shift to the rear, shifting lever 50 further against the bias of compression coil 114 until finally, at a predetermined viscosity, actuator 118 of limit switch 120 is shifted a sufficient amount to throw the limit switch. The amount of viscosity required to do this can be preset by adjusting the knob 116 to vary the initial preset compression on spring 114, and thus, the bias supplied thereto in opposition to the lever 150 actuating limit switch 120. When limit switch 120 is activated, it allows electrical power to flow to electric motor 140 that operates pump 146 through cam 42. This motor cycles through one revolution (or otherwise as desired) until limit switch 148 is thrown to deactivate the system, and during which time pump 146 sends a predetermined supply of solvent or carrier liquid from reservoir 154 through line 150, through the pump, through line 156–157 and into conduit 158 where the liquid is dispensed through its series of spaced orifices 158'. This drops down into the ink or other functional liquid to lower the viscosity thereof. Lowering this viscosity will, in succeeding printing strokes, cause the flow coater to shift a less amount and thereby prevent actuation of the pump again until the critical viscosity is again reached. Indicator bulb 124 shows when the pump is in operation.

Figure 7:
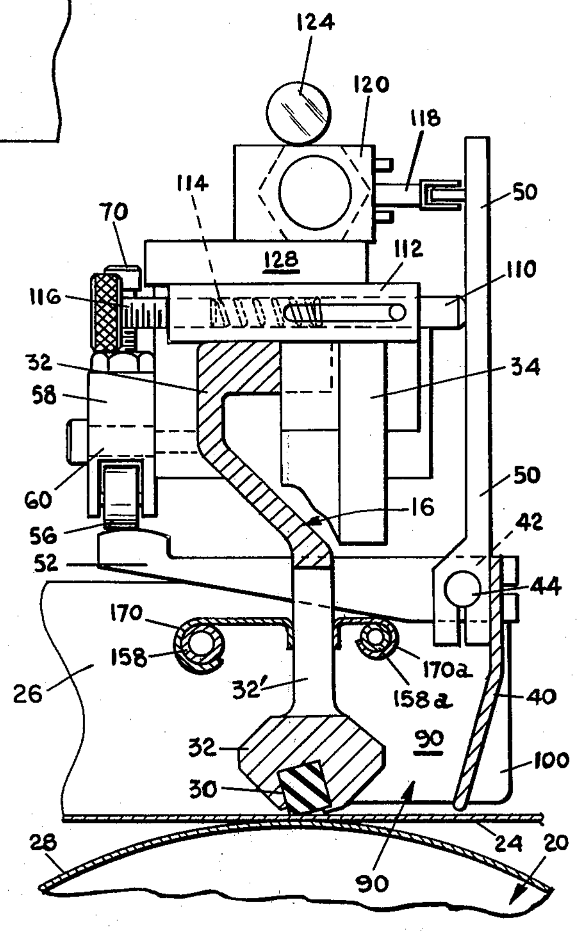
FIG. 7 is an end, partially sectional view of the apparatus in FIG. 6.

As noted previously, supply conduit 158 can be within the reservoir behind the squeegee, or ahead of the squeegee, as shown in the two alternative positions in FIGS. 3 and 7. The position within the reservoir is normally preferable when printing web stock, while the position ahead of the squeegee is normally preferable when printing sheet stock. Usually, when printing web stock, the squeegee begins actually forcing ink through the stencil very close to the screen frame leading edge, while, when printing sheet stock, the squeegee usually moves several inches before the actual printing starts. As a consequence, when printing web stock, there is usually only a small amount of excess ink collecting ahead of the squeegee and therefore, it would not normally be desirable to drop the solvent into this relatively small amount of ink because it would tend to drip through the stencil. Rather, the solvent is injected into the pool of ink in the reservoir. In contrast, when printing sheet stock, since the squeegee normally moves an initial several inches before the actual printing starts, considerable excess ink builds up ahead of the squeegee. The added liquid can, therefore, be dripped directly into this excess ink rather than into the small amount of ink left in the reservoir, particularly at the end of the print stroke. Obviously, this could vary considerably depending upon the nature of the exact stencil being used and the timing of the liquid injection, but these two alternatives are given for illustrative purposes and to show the preferred embodiments of the apparatus as applied to particular circumstances as presently encountered.

Various additional features, advantages, and objects of this invention will occur to those in the art upon reviewing this disclosure. The particular constructional details set forth are intended to be illustrative of the inventive concept, which is to be limited only by the scope of the appended claims and the reasonably equivalent structures to those defined therein.

The embodiments of the invention in which an exclusive property or privilege is claimed are defined as follows:

1. A squeegee, flow coater, and fluid viscosity control assembly for stencilling apparatus comprising: a squeegee; a flow coater; means for supporting said flow coater in spaced relationship behind said squeegee relative to the direction of coating, forming a fluid reservoir therebetween; passage means for recycling excess fluid from ahead of said squeegee back to said reservoir; said flow coater being mounted to allow fluid flow from said reservoir, beneath the lower edge of said flow coater; said flow coater being shiftable in response to increased viscosity of fluid flowing beneath its lower edge; viscosity decreasing liquid supply means for supplying liquid to decrease the viscosity of said fluid, with outlets adjacent said squeegee, said shiftable flow coater being operably connected with said liquid supply means to cause flow of viscosity decreasing liquid adjacent said squeegee with predetermined shifting of said flow coater.

2. The assembly in claim 1 wherein said liquid supply outlets are in communication with said reservoir to supply liquid to the fluid in said reservoir.

3. The assembly in claim 1 wherein said liquid supply means includes a pump and controlled drive means for causing said pump to operate momentarily, and wherein said shiftable flow coater is operably connected with said controlled drive means to cause momentary operation of said pump when shifting a predetermined amount.

4. The assembly in claim 1 wherein said flow coater is shiftable toward said squeegee to close said reservoir, and away therefrom to open said reservoir, and said assembly including shifting means operably connected with said flow coater for shifting it toward and away from said squeegee.

5. The assembly in claim 4 wherein said flow coater, when shifted away from said squeegee, is free to shift further in response to increased viscosity of fluid flowing beneath its lower edge.

6. The assembly in claim 1 wherein said flow coater is pivotally mounted to shift and said assembly including biasing means for resisting shifting of said flow coater.

7. The assembly in claim 1 including a pair of end plates extending between said squeegee and said flow coater to close the ends of said reservoir.

8. Screen stencilling apparatus comprising: means for supporting stock; means for supporting a stencil screen above said stock supporting means; a squeegee and flow coater assembly above said stencil screen supporting means and movable relative thereto; said squeegee and flow coater being spaced to provide a fluid reservoir therebetween, the squeegee being ahead of the flow coater relative to the direction of stencilling; said flow coater having a lower edge portion spaced above the level of the squeegee lower edge portion to allow fluid to flow from said reservoir beneath said flow coater onto the stencil screen in said screen supporting means as said squeegee and flow coater are moved relative to said screen supporting means and the stencil screen thereon; said flow coater being responsive to increase in viscosity of said fluid flowing therebeneath to shift in response thereto; and viscosity control means operably responsive to shifting of said flow coater to decrease the fluid viscosity.

9. The stencilling apparatus in claim 8 wherein said flow coater is shiftable toward said squeegee to close said reservoir, and away from said squeegee to open said reservoir; and including shifting means operably connected with said flow coater for so shifting it.

10. Coating apparatus comprising: means for supporting stock to be coated; means for supporting a screen above said stock supporting means; fluid supply means for supplying fluid onto said screen; a squeegee for forcing fluid on the screen, down through the screen onto stock on said stock supporting means; viscosity sensing means positioned to extend adjacent the screen for sensing the viscosity of the fluid as it is coated on said screen; and viscosity control means responsive to said viscosity sensing means for varying the fluid viscosity in said fluid supply means; recycle passage means through said squeegee to recycle excess ink on the screen ahead of the squeegee back into said fluid supply means; said viscosity sensing means comprising means for engaging the fluid as it is being coated on the screen, and movable with said squeegee; said fluid engaging, viscosity sensing means being biased to one position and being shiftable against the bias in response to increase in fluid viscosity, to controllably actuate said viscosity control means; said sensing means comprising a flow coater spaced from said squeegee to define a fluid reservoir therebetween, and slightly elevated relative to said squeegee, thereby forming said fluid supply means.

11. The coating apparatus in claim 11 wherein said recycle passage means includes passages through said squeegee to said reservoir.

* * * * *

UNITED STATES PATENT AND TRADEMARK OFFICE
CERTIFICATE OF CORRECTION

PATENT NO. : 3,973,491
DATED : August 10, 1976
INVENTOR(S) : Frank L. Porth, James A. Black, Harry Russell Farwell It is certified that error appears in the above-identified patent and that said Letters Patent are hereby corrected as shown below:

Column 1, line 23:

"into" should be ---onto---

Column 3, line 6:

After "drum" insert ---20---

Signed and Sealed this

Fifteenth Day of February 1977

[SEAL]

*Attest:*

RUTH C. MASON
*Attesting Officer*

C. MARSHALL DANN
*Commissioner of Patents and Trademarks*